United States Patent [19]
Jackson, Jr.

[11] Patent Number: 5,233,788
[45] Date of Patent: Aug. 10, 1993

[54] ACCESSIBLE TREE PROTECTOR

[76] Inventor: Leonard W. Jackson, Jr., 106 W. Marlette, Phoenix, Ariz. 85013-1524

[21] Appl. No.: 770,480

[22] Filed: Oct. 3, 1991

[51] Int. Cl.⁵ ............................................. A01G 13/60
[52] U.S. Cl. .................... 47/31; 52/DIG. 12
[58] Field of Search ............... 135/93; 47/31, 28.1, 47/26; 210/710.8, 710.9; 52/DIG. 12

[56] References Cited

U.S. PATENT DOCUMENTS

| | | | |
|---|---|---|---|
| 343,533 | 6/1986 | Crow | 47/21 |
| 349,066 | 9/1886 | Stahl . | |
| 367,134 | 7/1887 | Culver . | |
| 427,921 | 5/1890 | Shepherd | 47/31 |
| 480,242 | 8/1892 | Bankson | 24/710.8 |
| 510,079 | 12/1893 | Miller . | |
| 614,921 | 11/1898 | Zimmerman . | |
| 633,528 | 9/1899 | Morris | 47/21 |
| 994,083 | 5/1911 | McAdie | 47/21 |
| 1,072,339 | 9/1913 | Liljegran | 47/21 |
| 1,108,521 | 8/1914 | Scheuermann | 47/21 |
| 1,233,099 | 7/1917 | Miller | 47/21 |
| 1,780,950 | 11/1930 | Stevason | 47/31 |
| 2,197,929 | 4/1940 | Hale | 47/21 |
| 2,296,358 | 9/1942 | Marinsky | 135/97 |
| 2,420,706 | 5/1947 | Haven | 135/97 |

FOREIGN PATENT DOCUMENTS

| | | | |
|---|---|---|---|
| 15652 | of 1928 | Australia | 24/710.9 |
| 2643254 | 9/1978 | Fed. Rep. of Germany | 47/31 |

*Primary Examiner*—Henry E. Raduazo
*Attorney, Agent, or Firm*—Charles E. Cates

[57] ABSTRACT

A fruit tree protector has a plurality of stretchable netting pieces fastened together by hooks which may be C-shaped, and made of plastic, or copper wire, and the like.

19 Claims, 1 Drawing Sheet

ACCESSIBLE TREE PROTECTOR

FIELD OF THE INVENTION

The invention herein disclosed relates to devices for protecting the fruit in trees from birds.

BACKGROUND OF THE INVENTION

The Prior Art

For many years efforts have been made to protect the fruit ripening in the orchard from the depredations of birds, which are disposed to eat the fruit just as it ripens and before it can be picked. This is a particularly vexing problem to homeowners and small orchard proprietors. Whereas large commercial growers solve the problem by picking the green fruit long before it becomes attractive to birds, specialty growers and homeowners prefer to pick the fruit at its peak of ripeness (the quality of fruit picked green is not as good as tree-ripened fruit) for immediate consumption or for sale to the premium fruit market.

Consequently, there is a long history of efforts to find an ideal fruit tree protector: Typical of such efforts are patents to Hale, Pat. No. 2,197,929; Stevason, Pat. No. 1,780,950; Liljegran Pat. No. 1,072,339; McAdie, Pat. No. 994,083; Morris, Pat. No. 633,528; Zimmerman, Pat. No. 614,921; Shepherd, Pat. No. 427,921; Crow, Pat. No. 343,533 and Stahl Pat. No. 349,066. Although designed primarily for fumigating rather than protection, Culver, Pat. No. 367,134; Miller Pat. No. 510,079 and Scheuermann, Pat. No. 1,108,521 also show tree covers. Many provide access to the fruit without removing the entire cover but none provides a convenient, effortless access to the fruit in various parts of the tree. Some devices require machinery to install and remove, and many are awkward to handle.

Accordingly, it is an object of this invention to provide a tree protector that keeps birds away from the ripe fruit, is simple to install on the tree, is convenient to remove, but permits easy access by the grower to selected parts of the tree.

BRIEF SUMMARY OF THE INVENTION

I provide a tree protector that is constructed with a desired number of individual pieces or swatches of light-weight netting, held together by hooks, preferably C-shaped, which may cover all or a significant part of the tree. The netting is, preferably, stretched at least to some extent when the hooks are fastened. The resulting tension firmly holds the hooks and netting together, but does not hamper access between the hooks to a human hand to pick the fruit. If need be, one or more hooks may be removed, whereupon the netting may be turned back and rehooked in a temporary open position for fruit harvesting. Thus, the fruit may be selected and removed from any part of the tree when ideally ripe.

Because the swatches may be made a convenient size for individual handling, clothing a fruit tree with the protective covering is feasible by one person without the use of machinery. On larger trees, ladders and other supports may be required to reach the tops of the trees. Disassembly is equally simple and can be handled by one person working alone.

DESCRIPTION OF THE PREFERRED EMBODIMENT

Figure 1:
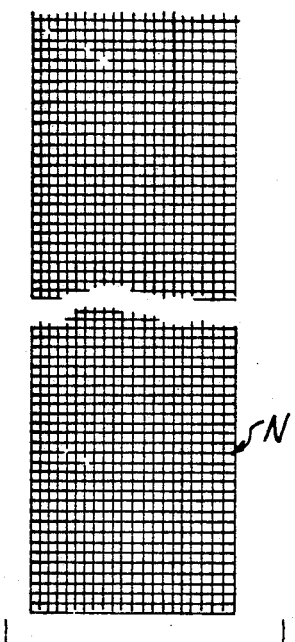
FIG. 1 shows a form of netting usable in the invention.
Figure 2:
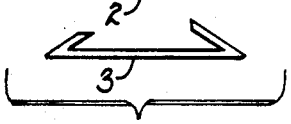
FIG. 2 shows hooks suitably shaped for use in the invention.
Figure 3:
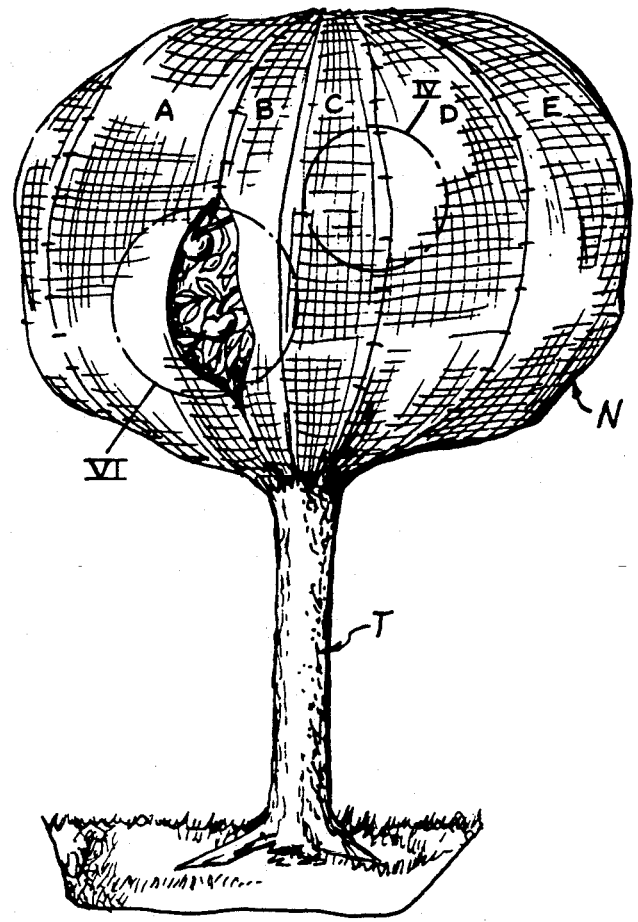
FIG. 3 shows netting fastened in place on a fruit tree.
Figure 4:
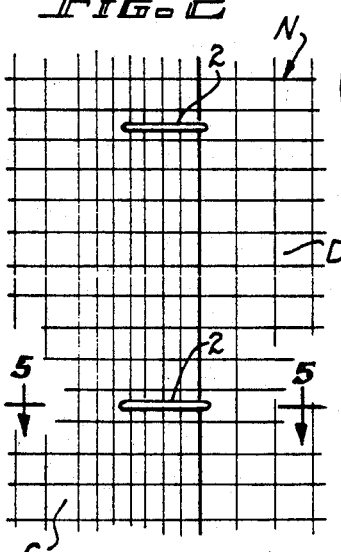
FIG. 4 is an enlarged detail view of area IV.

Turning now to the drawings, which show a presently preferred embodiment of the invention, a tree T is covered by independent, elongated swatches of netting N (as in FIG. 3, A, B, C, D and E) the sides of which are held together in stretching tension (FIG. 4) solely by C-shaped hooks H (FIG. 2). The elasticity of the netting puts tension on the hooks which fasten the swatches of netting around the tree (FIG. 3). Any number of swatches may be employed, depending on the size of the tree and the need for access to the fruit. The number shown in the drawings is merely exemplary.

Figure 6:
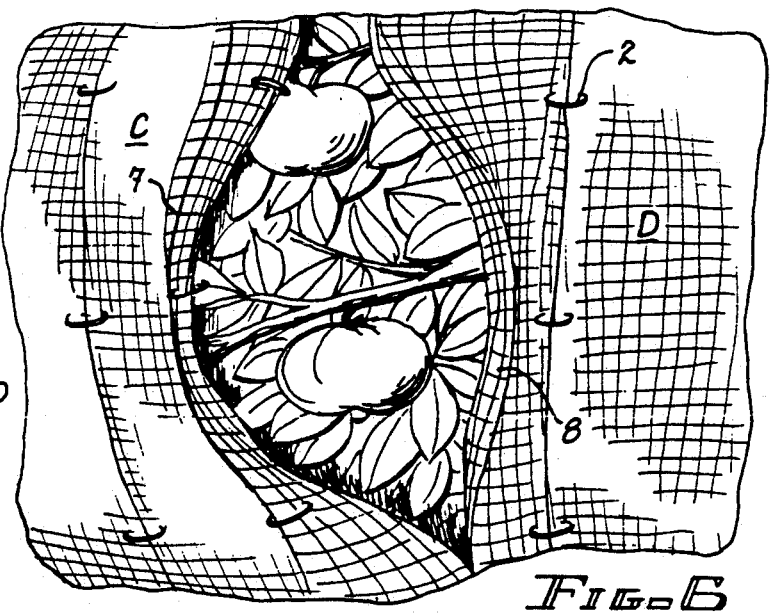
FIG. 6 is an enlarged detail view of area VI.
Figure 5:
FIG. 5 is a view in section of FIG. 4 taken along the line 5—5.

In FIG. 6, for example, the edges 7, 8 of swatches C and D of netting N are easily unfastened and turned back on the swatches C and D and re-fastened by hooks 2 to permit convenient access to the fruit F. The edges of the netting N are closed by hooks 2 when picking is not in progress, so that the birds cannot gain entrance. Thus, fruit may be left on the tree until it ripens to the stage desired without being eaten or spoiled by birds. For small quantity picking the picker's hand may be inserted between the hooks and the closed swatches of netting to reach nearby selected fruit, but the birds will not force an entry in that fashion.

The presently preferred embodiment employs hooks H made of plastic. The hooks may be white or colored, e.g. in a distinctive color such as international orange, to identify their locations. The plastic hooks may be U.V. protected to add to longevity. Copper wire, bare or coated, is one of several acceptable alternatives to plastic.

The embodiment of the best mode is plastic netting to take advantage of the stretch tension property and low cost. Suitable netting having satisfactory values of strength, tension and flexibility may be obtained from the following firms, among others: Ross-Daniels, Inc., 1720 Fuller Road, P.O. Box 65430, West Des Moines, Ia. 50265; Dalen Products, Inc., 11110 Gilbert Drive, Knoxville, Tenn. 37932; Weather Shade Corp., Apopka, Fla. 32703.

Persons ordinarily skilled in the art will understand the range of structures and materials equivalent to those discussed in the foregoing specification, all of which equivalents are embraced in the invention as defined in the appended claims.

What is claimed is:

1. Apparatus for protecting fruit trees from birds, comprising:
    a plurality of independent, elongated swatches having long sides of stretchable netting covering at least a part of a tree, said long sides of said swatches releasably fastened together solely by a plurality of hooks; whereby said plurality of swatches encloses the area to be protected.

2. The apparatus of claim 1 wherein said swatches are stretched before said hooks are set, whereby said hooks are firmly held by the tension produced by the stretched swatches.

3. The apparatus of claim 1 wherein said hooks are C-shaped.

4. The apparatus of claim 1 wherein said hooks are made of rigid plastic.

5. The apparatus of claim 2 wherein said hooks are made of rigid plastic.

6. The apparatus of claim 3 wherein said hooks are made of rigid plastic.

7. The apparatus of claim 1 wherein said hooks are made of copper wire.

8. The apparatus of claim 2 wherein said hooks are made of copper wire.

9. The apparatus of claim 3 wherein said hooks are made of copper wire.

10. The apparatus of claim 1 further comprising the absence of grommets or other strengthening devices in the netting to be fastened.

11. Apparatus for protecting fruit trees from birds, comprising a plurality of elongated, independent swatches of stretchable netting having sides covering at least a part of a tree, the elongated sides of said swatches being releasably fastened together solely by a plurality of hooks; whereby said plurality of swatches encloses the area to be protected.

12. The apparatus of claim 11 wherein said swatches are stretched before said hooks are set, whereby said hooks are firmly held by the tension produced by the stretched swatches.

13. The apparatus of claim 11 wherein said hooks are C-shaped.

14. In the method of protecting fruit trees from birds while making the fruit accessible to humans, the steps of:
   a. providing a plurality of elongated, independent pieces of netting sized in aggregate to provide coverage of the fruit bearing portion of a tree to be protected;
   b. providing a plurality of removable hooks to engage the edges of said pieces of netting;
   c. covering the portion of the tree to be protected with said plurality of pieces of netting, stretching said netting, and fastening the edges with said removable hooks.

15. The method of claim 14 wherein said hooks are C-shaped.

16. The method of claim 15 wherein the hooks are smooth shanked.

17. The method of claim 14 wherein removing one or more hooks is sufficient to gain entry for picking at selected places in the trees.

18. The method of claim 14 wherein the netting is plastic.

19. The method of claim 14 wherein the hooks are colored.

* * * * *